(12) United States Patent
Wiggins et al.

(10) Patent No.: US 6,684,898 B2
(45) Date of Patent: Feb. 3, 2004

(54) DUAL ACTUATOR AIR TURBINE STARTER VALVE (75) Inventors: Jimmy Wiggins, Chandler, AZ (US); Glenn Lane, Tempe, AZ (US); Dori Marshall, Apache Junction, AZ (US); Michael Kolic, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 160 days.

(21) Appl. No.: 09/967,128

(22) Filed: Sep. 27, 2001

(65) Prior Publication Data

US 2004/0000656 A1 Jan. 1, 2004

(51) Int. Cl.$^7$ ................................. F16K 1/22
(52) U.S. Cl. .................. 137/15.25; 60/788; 251/30.01; 251/289; 251/305
(58) Field of Search ............. 251/289, 30.01, 251/305; 137/15.25; 60/786, 788, 787

(56) References Cited

U.S. PATENT DOCUMENTS

| | | | |
|---|---|---|---|
| 3,056,573 A | 10/1962 | Matheson et al. | 251/31 |
| 3,179,471 A | * 4/1965 | Savage | 251/289 |
| 3,204,920 A | 9/1965 | Generke | |
| 3,261,266 A | 7/1966 | Ledeen et al. | 92/138 |
| 3,452,961 A | 7/1969 | Forsman | 251/31 |
| 3,662,899 A | * 5/1972 | Randolph et al. | 251/289 |
| 3,769,998 A | 11/1973 | Avant | |
| 3,982,725 A | 9/1976 | Clark | 251/14 |
| 4,069,836 A | * 1/1978 | Sowinski | 251/289 |
| 4,113,063 A | * 9/1978 | Troy | 251/69 |
| 4,232,709 A | * 11/1980 | Zoric | 251/289 |
| 4,702,273 A | 10/1987 | Allen, Jr. et al. | 137/487.5 |
| 4,805,873 A | 2/1989 | Mouton | 251/31 |
| 4,850,319 A | 7/1989 | Imoehl | 123/361 |
| 4,871,296 A | 10/1989 | Laessle et al. | 415/123 |
| 4,914,906 A | 4/1990 | Burch | 60/39.142 |
| 4,926,631 A | 5/1990 | Sorenson | |
| 4,964,422 A | 10/1990 | Ball et al. | 135/512.1 |
| 4,964,431 A | 10/1990 | Ball et al. | 137/1 |
| 4,967,778 A | 11/1990 | Ball et al. | 137/1 |
| 5,000,213 A | 3/1991 | Tervo et al. | 137/1 |
| 5,005,804 A | 4/1991 | Andersen et al. | 251/215 |
| 5,029,599 A | 7/1991 | Ball | 137/1 |
| 5,067,506 A | 11/1991 | Ball et al. | 137/1 |
| 5,102,097 A | 4/1992 | Davis et al. | 251/283 |
| 5,113,910 A | 5/1992 | Ball | 137/630.15 |
| 5,245,820 A | 9/1993 | Zalewski et al. | 60/39.08 |
| 5,267,433 A | 12/1993 | Burch | 60/39.142 |
| 5,386,848 A | 2/1995 | Gilchrist et al. | 137/510 |
| 5,429,153 A | 7/1995 | Squirrell | 137/385 |
| 5,467,529 A | 11/1995 | Gilchrist et al. | 29/890.128 |
| 5,499,651 A | 3/1996 | Gallo et al. | |
| 5,752,383 A | 5/1998 | Rominek | 60/407 |
| 6,173,740 B1 | 1/2001 | Marinoni et al. | 137/554 |

FOREIGN PATENT DOCUMENTS

| | | |
|---|---|---|
| EP | 0 182 408 | 5/1986 |
| GB | 1 430 612 | 3/1976 |
| WO | PCT/US02/30737 | 1/2003 |

* cited by examiner

*Primary Examiner*—John Bastianelli
(74) *Attorney, Agent, or Firm*—Robert Desmond, Esq.

(57) ABSTRACT

An air turbine starter valve able to open despite being frozen shut. Dual actuators apply sufficient torque upon an air turbine starter valve to overcome obstructions presented by frozen moisture. By applying separate and generally-aligned torques, the actuators are able to provide sufficient force to overcome the adhesion provided by frozen moisture between the valve plate and adjacent structures.

40 Claims, 8 Drawing Sheets

DUAL ACTUATOR AIR TURBINE STARTER VALVE

TECHNICAL FIELD

This invention relates to air turbine engine starters and more particularly to air turbine starter valves controlling the flow of compressed air to such starters.

BACKGROUND ART

Air turbine type starter motors are driven by the energy of a compressed gas such as air and are often used for starting an aircraft gas turbine, or jet, engine. Honeywell International, Inc., the developer of this invention, is a leader in the air turbine starter business. Compressed air flows to the starter which causes rotation of the compressors and the turbines within the jet engine. Upon sufficient air flow through the jet engine (reflected by turbine speed or otherwise), the jet fuel can be ignited within the combustion area/combustor to start the engine. Without the compressor/turbine rotation provided by the starter, fuel combustion and air flow through the engine will not be sufficient to start the engine. The compressed air for the air turbine starter is controlled by a starter valve, such as an air regulating and shutoff butterfly valve.

A source of relatively clean dry air is desired to power the air turbine starter. The most common sources of compressed/pressurized air for this purpose are an auxiliary power unit, bleed air from the compressor stage of another operating gas turbine engine, or a gas turbine ground power cart. Upon actuation of the engine start switch, the starter valve is energized and opens at a controlled rate to permit air to flow to the air turbine starter. The air turbine starter valve output air flow spins components of the air turbine starter motor, which converts the energy in the moving air to torque. This torque is applied to the engine gearbox which is then accelerated to a predetermined cut off speed whereupon the engine can start. The pilot may manually terminate this start cycle by opening the start switch. Automatic termination may be provided for by a speed sensitive switch built into the starter or by a main engine speed signal read by a fully-automated digital engine controller, commonly known as an FADEC. When the start cycle is terminated, the starter valve is closed, thereby cutting off the airflow that powers the air turbine starter. When the starting air flow is cut off, the air turbine starter automatically disengages from the engine accessory drive shaft and comes to a stop.

The starter valve controls the operation of the air turbine starter by controlling the rate at which it opens and closes and/or by a pressure regulating system that delivers substantially constant pressure to the starter regardless of the upstream air pressure. These functions in a conventional starter control valve may be implemented by mechanical-pneumatic control devices such as orifices, needle valves, springs or diaphragms. Limitations of these devices may include excessive design and manufacturing complexity, difficulty of adjustment, sensitivity to environmental changes and poor repeatability.

The starter control valve should control the pressure of air initially supplied to the air turbine starter to prevent destructive shock to the mechanism. As the starter speed increases, the rate of increase in air pressure is typically progressive to effect a smooth, rapid acceleration of the mechanism. In addition, the control valve may serve to maintain air pressure by responding to the air pressure sensed on the upstream side of the air turbine starter valve.

A control valve of this type should regulate pressure, limit pressure rise rate, and control the speed of the air turbine starter. It is also desired to meet specific speed requirements over a wide range of changing loads. Moreover, control valves usually do not provide high frequency response because of the difficulty in controlling valve dynamics and nonlinearities such as friction and aerodynamic forces.

One challenge that has arisen in the use and implementation of conventional starter control valves is the obstruction of the valve by ice. In particular, when an aircraft is on the ground, moisture present under cold and humid conditions can freeze the starter valve shut and thereby prevent initial engine start. When an aircraft is in the air, particular cold conditions of high altitude flight may cause ice to freeze the valve shut and prevent the restart of an engine after it shuts down. While certain remedies are currently available, such as providing a warming blanket or the like, the ice that forms is generally from only 2–5 milliliters of water. This amount of ice can generally be broken by the application of sufficient force to free the starter valve. Conventional starter valves, while sufficiently safe, may be, under certain circumstances, unable to provide such force to break the starter valve free of the ice.

One air turbine starter valve uses a force-offset actuator that produces a low torque at minimum pressure. While being sufficiently safe and reliable, this low torque can be insufficient to break an ice build up around the butterfly plate that controls air flow through the valve. Thus, a need exists for an air turbine starter valve that can function despite internal ice accumulation. The present invention satisfies this need.

SUMMARY OF THE INVENTION

The present invention provides an air turbine starter valve system that can break ice build-up that may form inside the valve under certain conditions. The actuator that serves to open the butterfly plate has two single-acting spring-return pistons connected to a common linkage. The dual actuators increase the torque available to open the butterfly plate by four times (400%). This significant increase in torque overcomes the frozen moisture that accumulates around the butterfly plate and breaks the ice to allow the valve to open after it has been frozen shut. Frozen valves opened by the dual actuator system or present invention, are able to open normally with minimum pressure. This eliminates flight delays, flight cancellations, or restarting problems at altitude.

Pressurized air flow approaches the butterfly plate and is sent to the actuators, which move through a displacement in accordance to the pressure applied. This displacement is supplied to a moment arm via common linkage between the two dual actuators. The torque then arising on the butterfly plate is sufficient to break frozen moisture about the valve, thus opening the plate and allowing the pressurized air to flow onward to the air turbine starter.

Other features and advantages of the present invention will become apparent from the following description of the preferred embodiment(s), taken in conjunction with the accompanying drawings, which illustrate, by way of example, the principles of the invention.

MODE(S) FOR CARRYING OUT THE INVENTION

The detailed description set forth below in connection with the appended drawings is intended as a description of one or more presently-preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that may fall within the spirit and scope of the invention.

Figure 1:
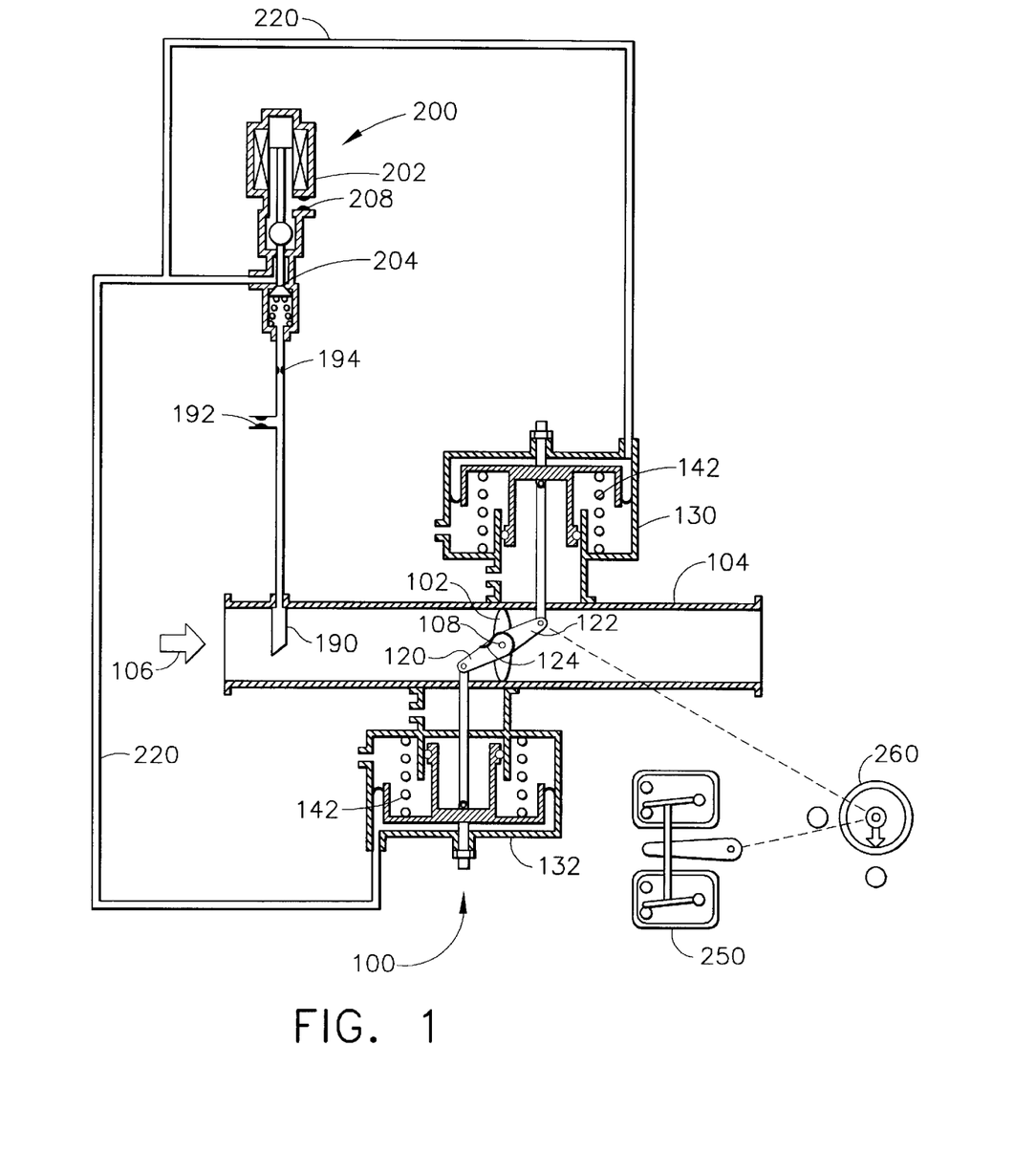
FIG. 1 shows a schematic and cutaway view of the starter control valve of the present invention with its two actuators. Position switches and a manual override and visual position indicator are also shown.
Figure 2:
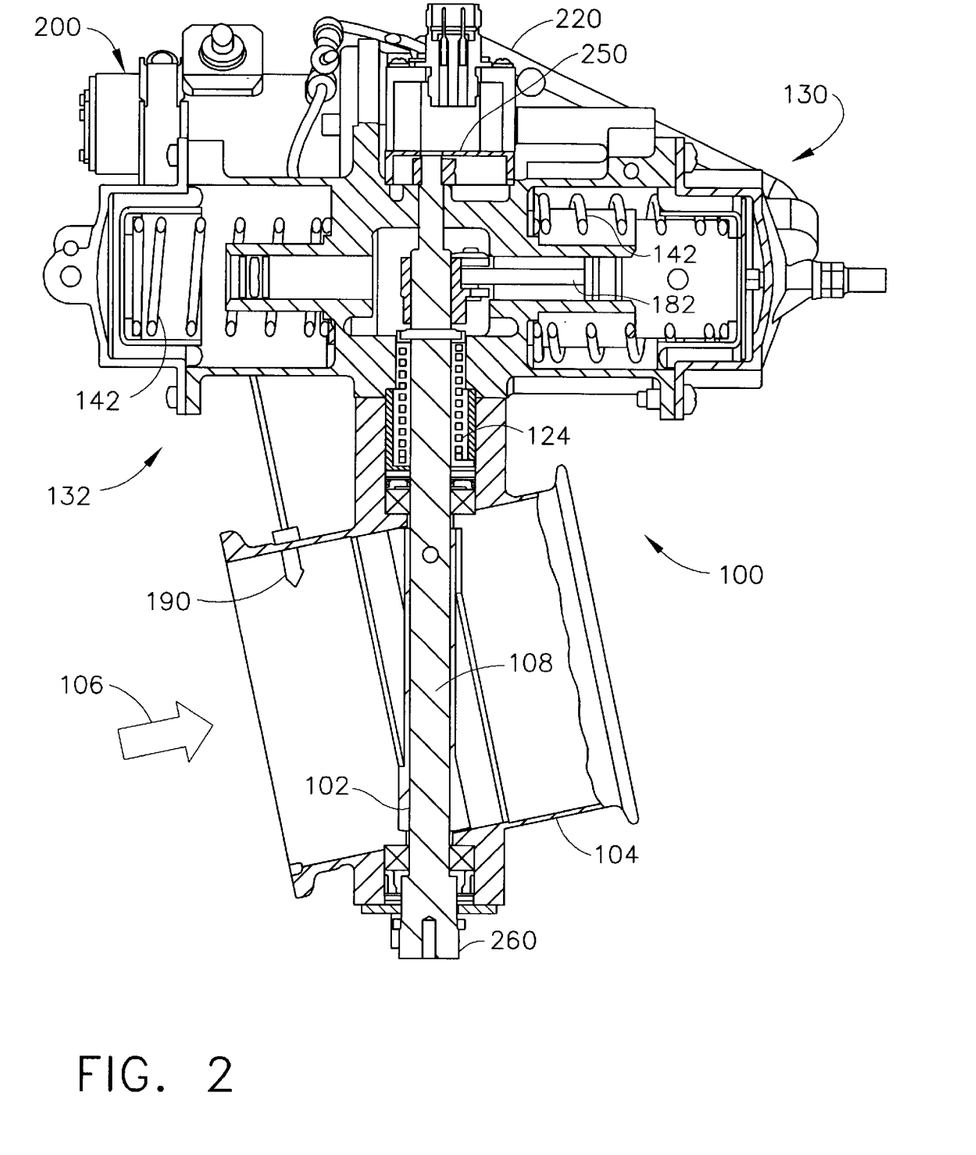
FIG. 2 is a side cross-sectional view of the starter control valve of the present invention shown in FIG. 1 with its two actuators as potentially realized in a real-world embodiment.
Figure 7:
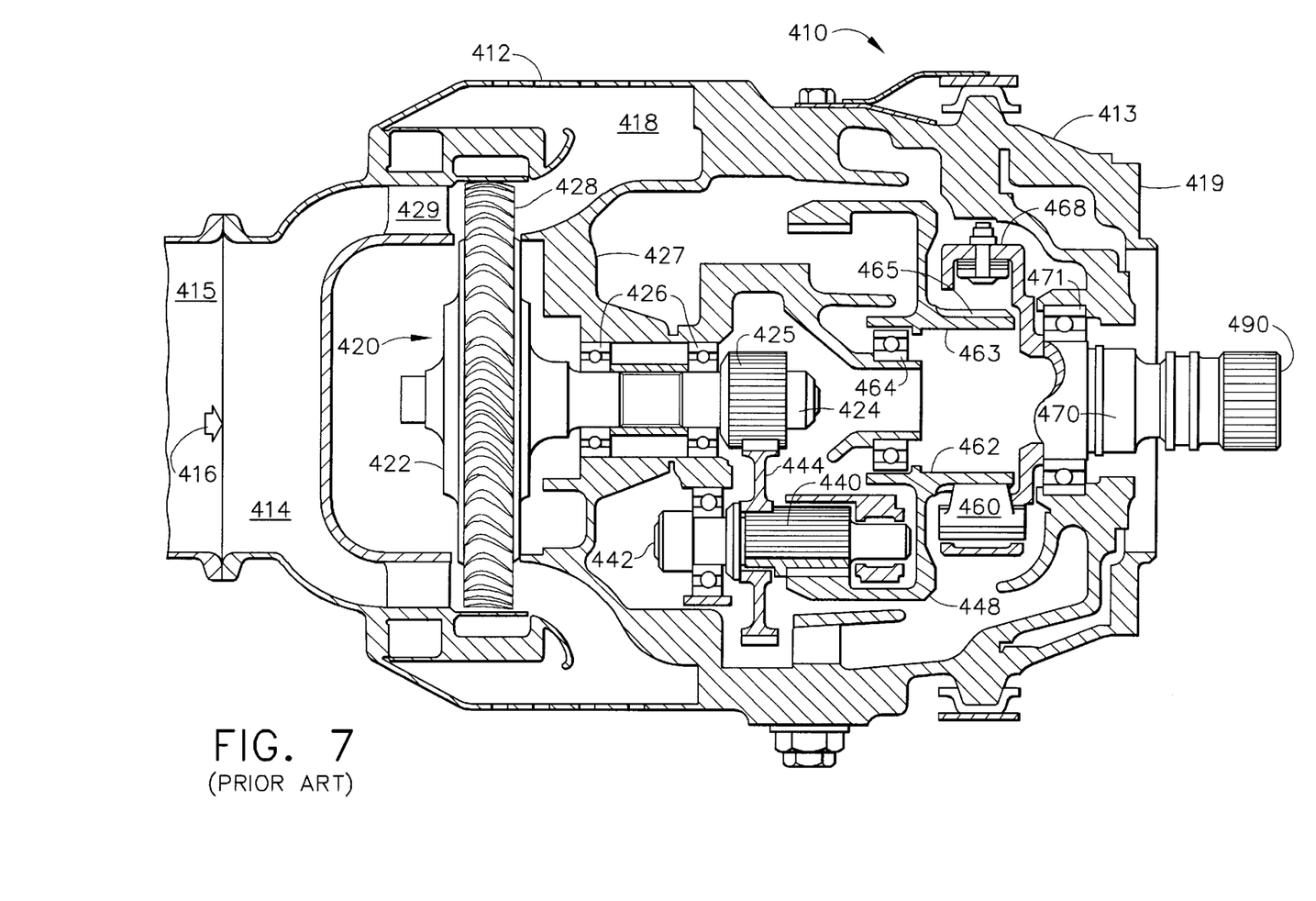
FIG. 7 is a plan cross-sectional view of a Honeywell air turbine starter having the designation ATS 100.
Figure 8:
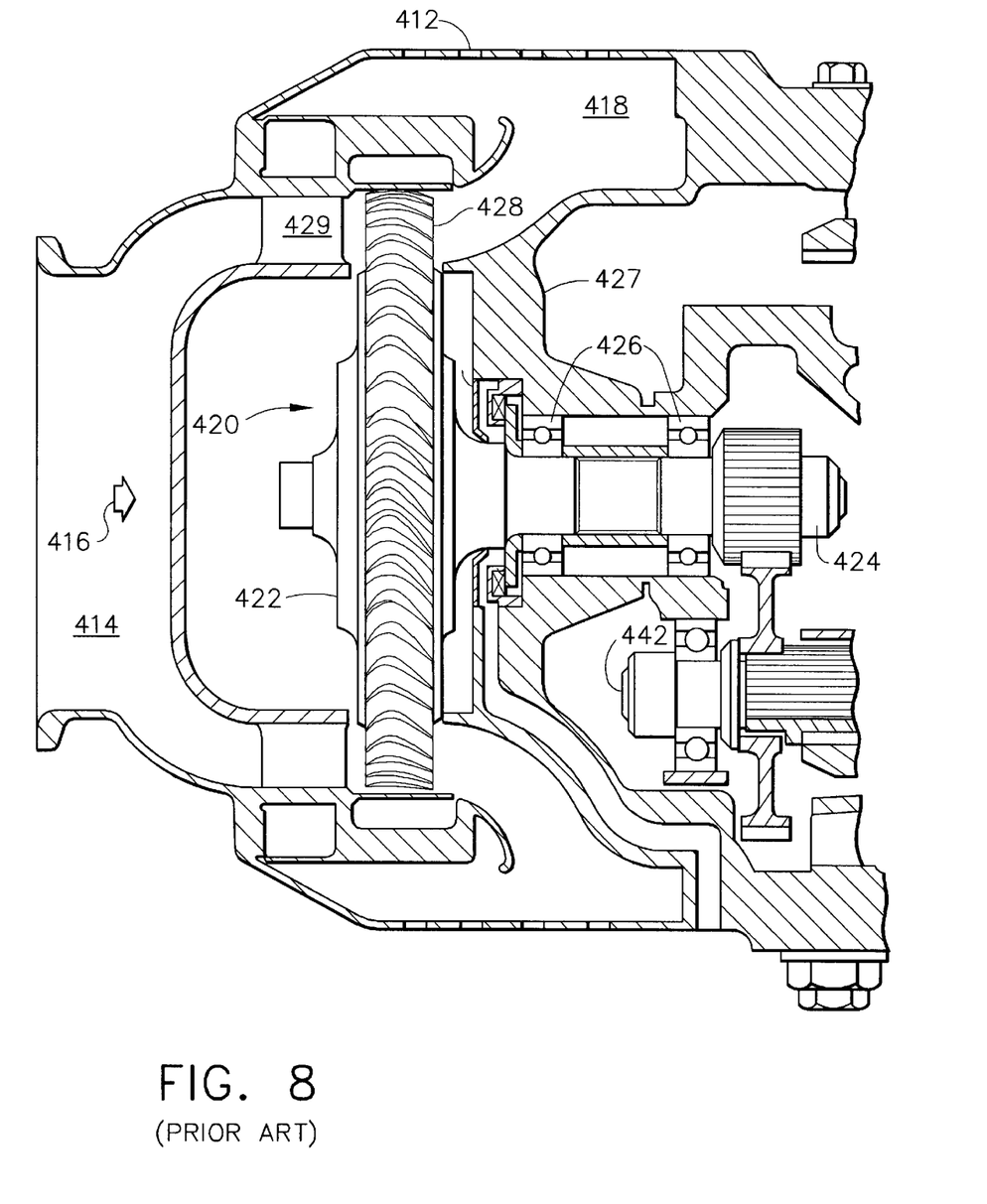
FIG. 8 is a blow-up of the turbine section of the air turbine starter of FIG. 7.

As shown in FIGS. 1 and 2, the dual actuator starter control valve 100 of the present invention has a butterfly valve 102 positioned in a duct 104 for the control of pressurized air flow 106 to an air turbine starter such as that shown in FIGS. 7 and 8. The opening and closing of the butterfly valve 102 serves to allow the air flow 106 past it and on to the engine starter. Initially, the valve is closed (as shown in FIG. 1) and the valve opens by rotating about a central sealed shaft 108 until it is perpendicular to its position as shown in FIG. 1 in the same plane. The butterfly valve 102 is generally circular in nature or otherwise has a perimeter conforming to the inner geometry of the duct 104. In some embodiments, the butterfly valve 102 may be at an angle with respect to the main axis of the duct 104. Two lever arms 120, 122 extend outwardly into the actuators 130, 132 and provide moment arms upon which torque can be applied about the central sealed shaft 108 and consequently upon the butterfly valve 102. A torsion spring 124 and the two return springs 142 in the actuators 130, 132 urge the butterfly valve 102 into the closed position as do the unpressurized actuators, about which more is described below. Preferably, the return springs 142 provide a linear restoring responsiveness.

As shown in FIG. 1, each actuator may have the same physical construction and is placed with respect to the butterfly valve 102 so that it applies sufficient torque upon the valve 102 such that frozen moisture or otherwise may be broken through by the normal operation of the actuators 130, 132. Using the relative depiction set forth in FIG. 1, an upper actuator 130 and the lower actuator 132 are placed on opposite sides of the butterfly valve 102, generally in a common housing situated above or outside the duct 104. As the depiction shown in FIG. 1 may be vertical, horizontal, or otherwise, it can be seen that the actuators 130, 132 are opposed and offset by the effective combined length of the lever arms 120, 122. Other relative geometries between the actuators may be advantageously realized and are within the contemplation of the present invention.

As each of the two actuators is generally the same, a description herein is given of the upper actuator 130 with an understanding that the same elements and structures also apply to the lower actuator 132. As shown in FIGS. 1 and 2, the upper actuator 130 is shown in cross section. When rotated 180 degrees (180°) about the actuator rod 182, the viewer will have a better appreciation of the three-dimensional construction of the actuator 130.

Figure 3:
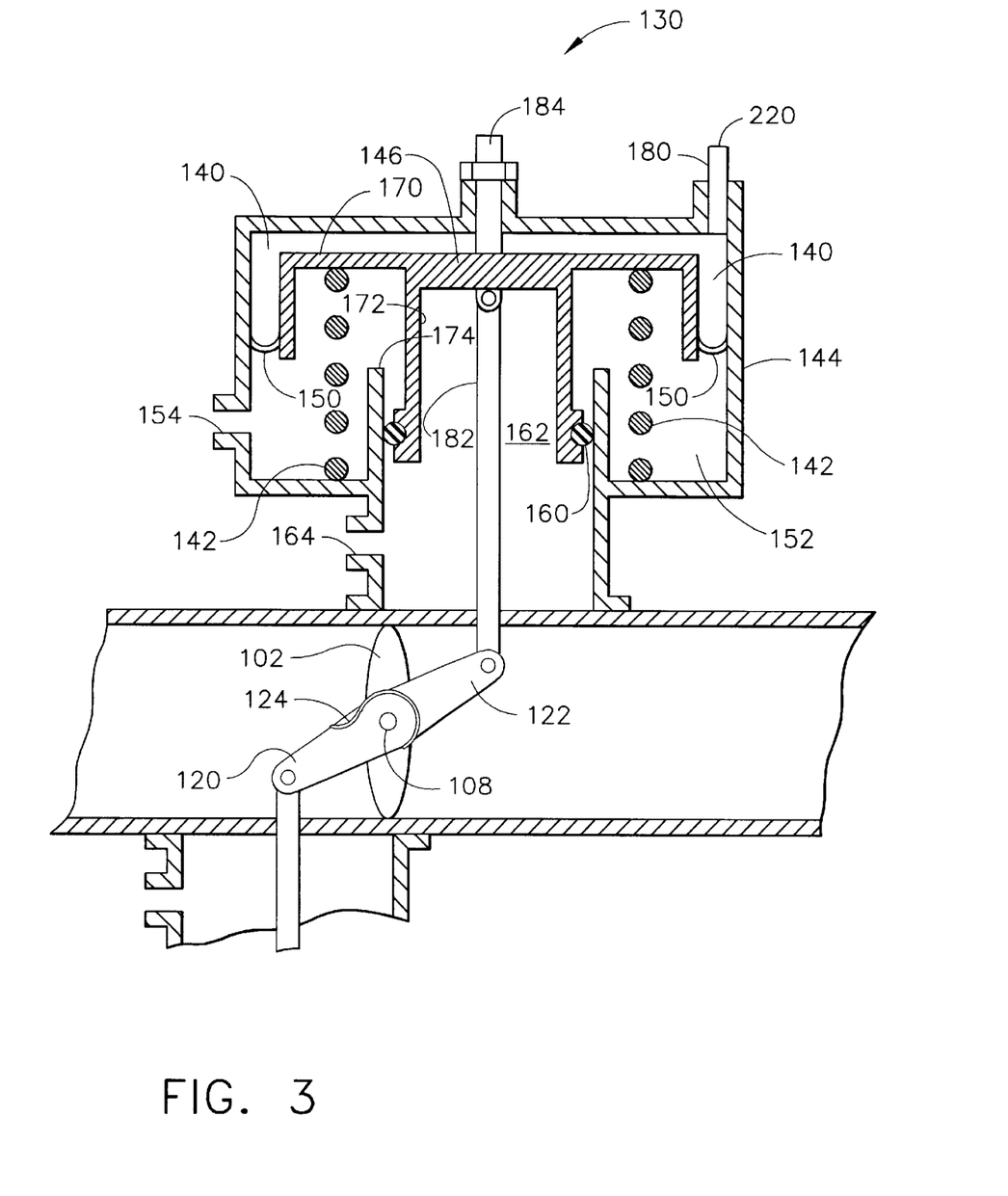
FIG. 3 is an enlargement of an actuator shown in FIG. 1.
Figure 4:
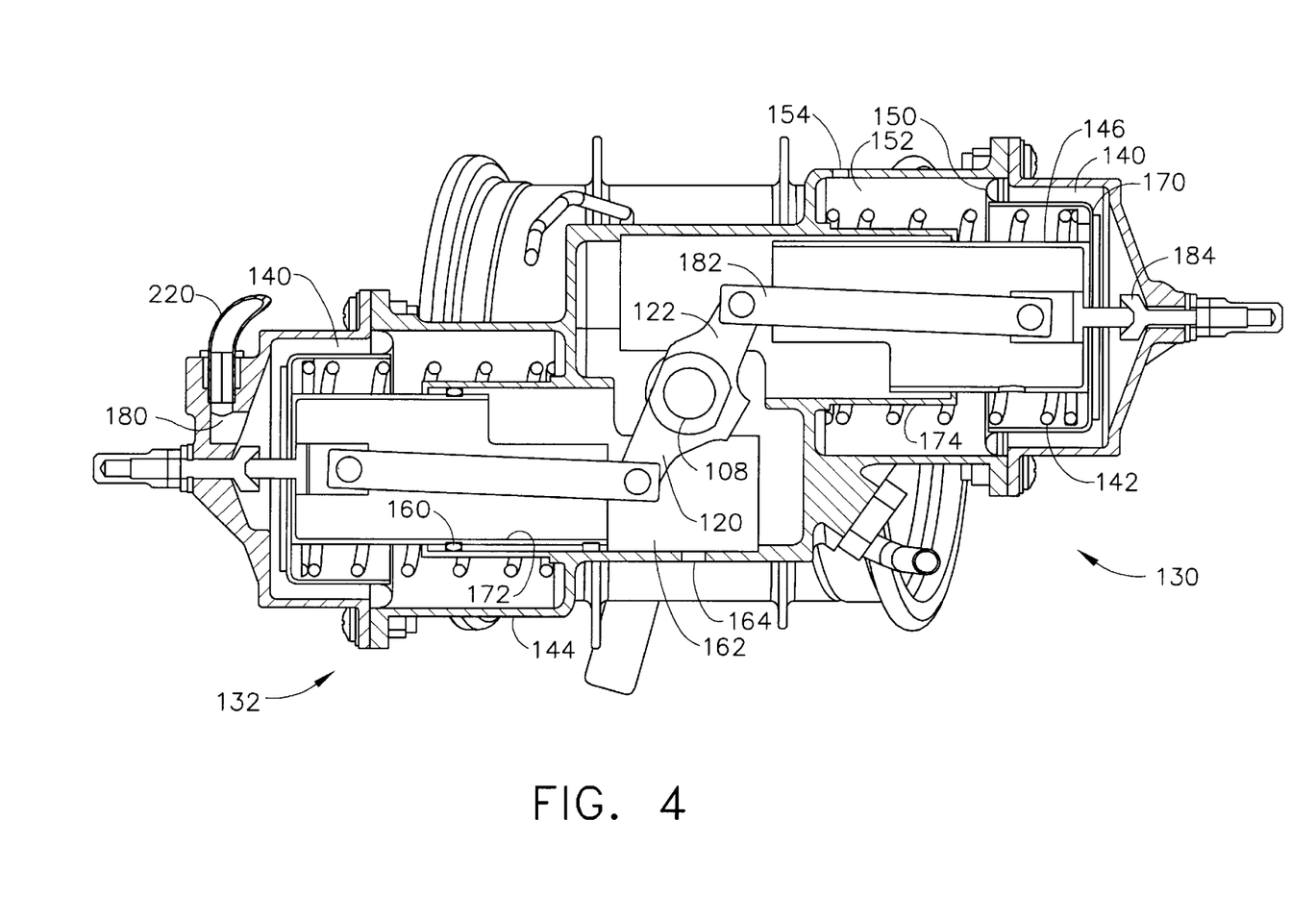
FIG. 4 is a side cross-sectional view of the actuator shown in FIG. 3 as potentially realized in a real-world embodiment.

Referring now to FIGS. 3 and 4, the actuator 130 defines three chambers, two of which are vented to ambient pressure. A primary or opening chamber 140 is ultimately coupled to the pressurized airflow 106. The pressure within the opening chamber 140 creates a force (pressure times area equals force) that serves to press against the restoring spring 142 and the lever arm 122 connected to the butterfly valve 102. The actuator housing 144 serves to define the three chambers while providing support for the piston 146 as it travels through the housing. An opening chamber diaphragm 150 serves to sealingly separate the opening chamber 140 from the spring chamber 152. The opening chamber diaphragm 150 rolls and translates with the piston 146 as is travels through the housing 144. The spring chamber 152 is vented to ambient through the spring chamber vent 154.

The piston chamber guide 160 provides a dynamic seal, serving to seal and separate the piston chamber 162 from the spring chamber 152. The piston chamber guide 160 helps to prevent abrasion between the inner toroidal flange 172 of the piston 146 and the inner cylinder wall 174 of the actuator housing 144. The piston chamber guide 160 also serves as a guiding and centering mechanism for the piston 146. The piston chamber 162 is vented to ambient through the piston chamber vent 164.

As shown in FIG. 3, the piston 146 has an outer toroidal flange 170 that engages the opening chamber diaphragm 150 and moves parallel to the actuator housing 144. The inner toroidal flange 172 extends downwardly within a cylinder defined by an inner upwardly-extending wall 174 extending from the actuator housing 144. The restoring spring 142 is held in place by the outer toroidal flange 170 and is trapped between the flange 170 and the housing 144. The inner toroidal flange 172 engages the inner cylinder wall 174 with the interface between the two sealed by the piston chamber guide 160. The piston chamber guide 160 prevents abrasion between the moving parts and acts as a guiding mechanism that keeps the piston 146 centered.

When the actuator 130 is pressurized by the air flow 106, air under pressure flows into the opening chamber 140 along passages 220 and via the inlet 180. The opening chamber 140 is then pressurized and force is exerted upon the piston 146. When the pressure inside the opening chamber 140 is sufficient to overcome the selected set point of restoring spring 142, the piston 146 begins to move downwardly within the actuator housing 144. This causes the actuator rod 182 to translate with respect to the actuator housing 144. The pivotably attached lever arm 122 or 120 is also forced at its distal end to translate with the actuator rod 182. This exerts a torque on the butterfly plate 102, urging the valve open. Air that is present within the spring chamber 152 and the piston chamber 162 exits through the respective vents 154, 164. Likewise, the vents 154, 164 allow the ingress of air into the respective chambers when the restoring spring 142 pushes the actuator piston 146 to its non-pressurized position.

The downward travel of the actuator piston 146 is obstructed by the upper end of the inner cylinder wall 174.

The displacement provided by the actuator piston 146 should generally match that needed to take the butterfly valve 102 from its closed to its open position. A lock nut adjustment 184 provides an adjustable means by which the initial non-pressurized position of the actuator piston 146 can be controllably adjusted. When the pressure from the air flow 106 is removed, the restoring spring 142 urges the piston 146 to its shown position, closing the butterfly valve 102.

Having described above the butterfly valve system 100 and the actuators 130, 132 for it, description is made below of the pressurization system by which the actuators 130, 132 are pressurized in a uniform and equal fashion. The air flow 106 serves as the pressure source for the actuators 130, 132 and the transmission of the pressurized air 106 is provided in a controlled manner so that selectable operation of the butterfly valve 102 is achieved.

Referring now to FIG. 1, when pressurized air flow 106 is impressed upon the closed butterfly valve 102, the pressure backs up and will attempt to flow through any available path. A downstream-facing probe 190 provides an open path by which pressurized air can flow to the actuators 130, 132. Pressurized air travels into the probe 190 and past a purging orifice 192 where contaminants are allowed to escape. The pressurized air then encounters an opening rate orifice 194 which controls the travel of air past it but not the ultimate pressure which is only limited temporarily by the opening rate orifice 194. The pressurized air then encounters a solenoid control valve 200. The solenoid 202 controls the operation of the accompanying valve mechanism 204.

Figure 5:
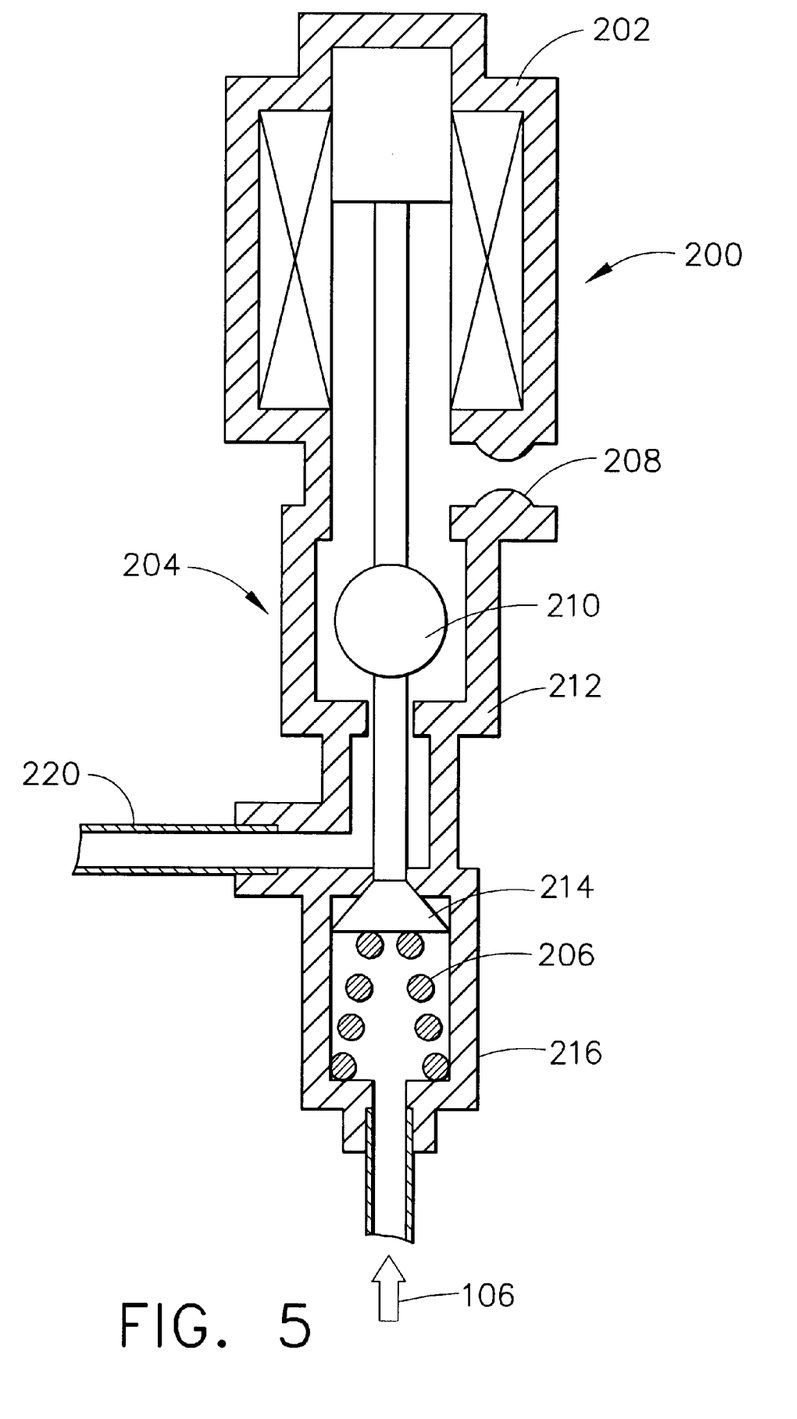
FIG. 5 is an enlargement of the solenoid valve shown in FIG. 1.
Figure 6:
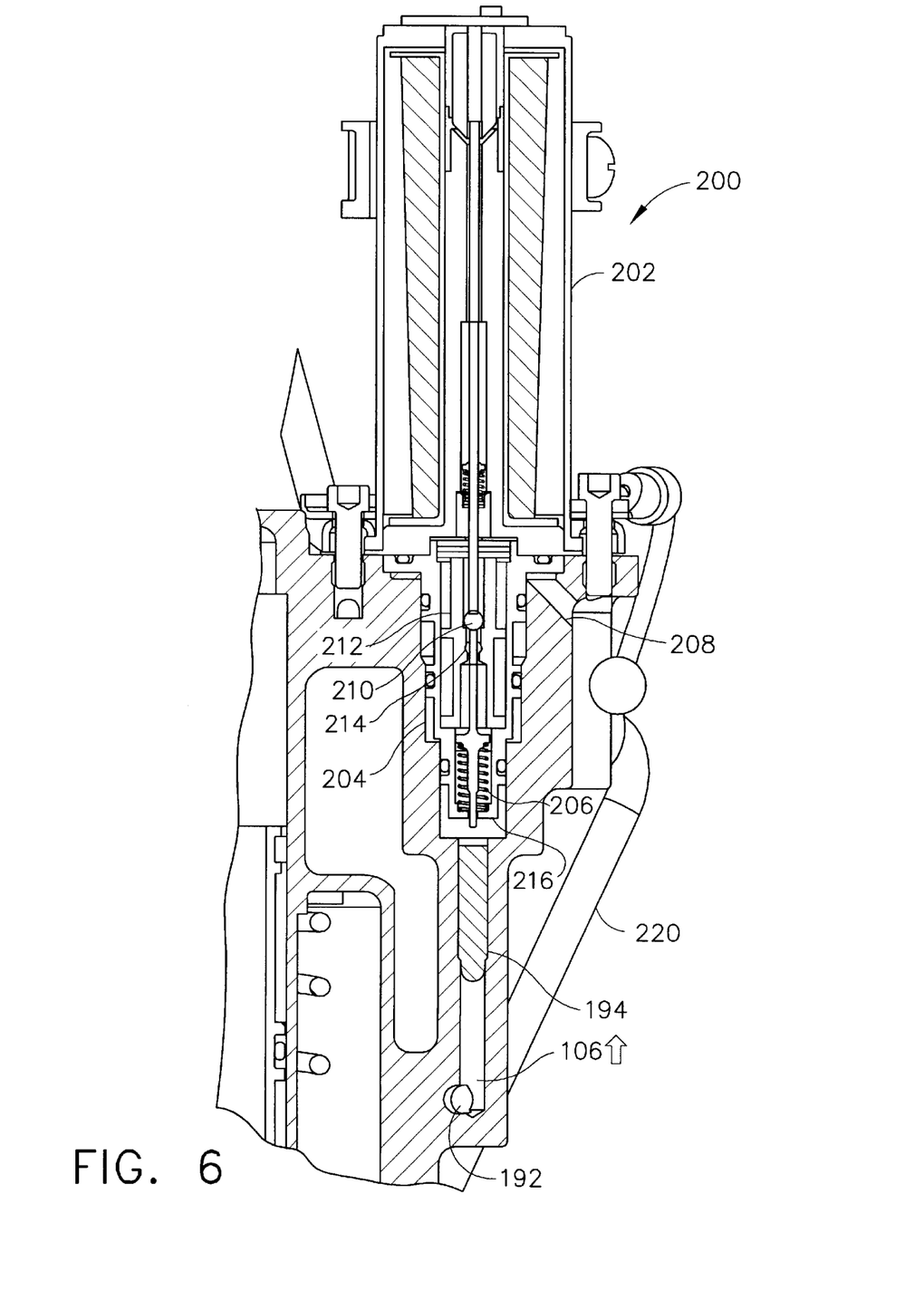
FIG. 6 is a side cross-sectional view of the solenoid valve shown in FIG. 5 as potentially realized in a real-world embodiment.

Referring now to FIGS. 5 and 6, the solenoid control valve 200 allows pressurized air 106 to flow past the valve mechanism 204 when energized and allows such pressurized air to reach the actuators 130, 132. Otherwise, and when the solenoid control valve is de-energized, it prevents such pressurized air from reaching the actuators 130, 132. Valve spring 206 urges the valve mechanism 204 shut when the solenoid 202 is not energized and closing rate orifice 208 then allows the discharge of the pressurized air to ambient in a controlled fashion. While the closing rate orifice 208 provides sufficient ventilation for the actuators 130, 132, for safety, the closing rate orifice 208 fails in a closed manner to allow the butterfly valve 102 to close should a failure occur. In this way, air is held in by the butterfly valve 102 and provides needed resistance for the associated air turbine (not shown).

When the solenoid 202 is energized, valve ball 210 seats itself in the chamber 212 to prevent air flow to the closing-rate orifice 208. The poppet plate 214 is simultaneously unseated from the inlet mouth of its chamber 216. Pressurized air flow is then transmitted to the opening chambers 140 of the actuators 130, 132 via actuator lines or ducts 220.

In operation, the air turbine starter (ATS) valve of the present invention is initially in its de-energized state and pressurized air flow is impeded by the butterfly valve 102. The pressure attempts to escape via the probe 190, but cannot until solenoid-controlled valve 200 is energized and the valve mechanism 204 opens. Upon opening, the valve mechanism allows the pressurized air 106 to flow to the actuators 130, 132 which overcome the force of the restoring springs 142. The pistons 146 then travel toward the butterfly valve 102 until obstructed by the inner cylinder walls 174. As they travel, the pistons 146 apply a torque upon the butterfly valve 102 via the actuator arms 182 and the lever arms 120, 122. As the applied torque of the two actuators 130, 132 is generally twice that of a single actuator, additional torque is applied to the butterfly valve 102 which is generally sufficient to break any frozen moisture holding the butterfly valve 102 shut.

To close the butterfly valve 102, the air pressure 106 may be stopped or the solenoid-controlled valve 200 may be deenergized. When the solenoid is deenergized, the valve spring 206 seats the poppet plate 214 in its chamber 216, sealing it shut. Additional pressurized airflow is then repelled and shunted to the purging orifice 192. The valve spring 206 then also opens the path to the closing-rate orifice 208 from the opening chambers 140 of the actuators 130, 132. The valve 204 is opened with the unseating of the valve ball 210 from the mouth of the valve chamber 212 by the force of the valve spring 206. Pressure is then equalized on either side of the piston 146 by the closing rate orifice 208 and combined ventilation of the spring chamber vents 154 and piston chamber vents 164. Any residual pressure present in the opening chambers 140 is allowed to escape through the closing rate orifice 208. The restoring spring 142 then urges the pistons 146 back towards the lock nut adjustments 184, closing the butterfly valve 102. Spring chamber vents 154 and piston chamber vents 164 allow ambient air back into the respective chambers, equalizing pressure across the piston 146.

In order to provide better operation and confidence in the status of the air turbine starter valve 100 of the present invention, position switch enunciators 250 and a manual override and visual position indicator 260 are provided. The position switches 250 allow automatic feedback of the operational state of the air turbine starter valve 100 and the butterfly plate 102. The manual override and visual position indicator 260 allows manual operation of the ATS valve 100 while simultaneously providing visual indication as to the open or closed nature of the butterfly plate 102.

The dual actuator starter control valve 100 is generally connected to an air turbine starter. FIG. 7 shows one such air turbine starter 410 that could be used in conjunction with the dual actuator starter control valve and embodying the present invention. The air turbine starter 410 has a first housing assembly 412 and a second housing assembly 413. The housing assembly 412 defines a flow path 414 extending from an inlet 416 to an outlet 418. The housing assembly 413 includes a mounting flange 419 for mounting the air turbine starter to an aircraft engine (not shown). An air pressure duct 415 delivers pressurized air from an air supply to the inlet 416. Typically, the air pressure at the inlet 416 is in the range of 30–40 psig.

Within the air turbine starter 410, the housing assemblies 412 and 413 support a turbine section 420, a compound planetary gear train 440, and an overrunning clutch 460.

The turbine section 420 is comprised of a turbine wheel 422 having a rotatable shaft 424 extending therefrom, journaled by bearings 426 to a turbine exhaust housing 427, which is part of housing 412. A gear 425 secured to the shaft 424. A plurality of turbine blades 428 are circumferentially mounted to the turbine wheel 422 and are positioned within the flow path 414. Upstream of the blades 428 are a plurality of nozzles 429 mounted to the housing assembly 412 which provide the proper flow angle to the air flow before it enters the turbine blades 428. In operation, pressurized air entering through inlet 416 is properly aligned by the nozzles 429 and is then expanded across the blades 428 before exiting through outlet 418. The blades 428 convert the pressure energy of the air into rotary motion causing the turbine wheel 422, the shaft 424 and the gear 425 to rotate at the same speed as the blades 428.

The compound planetary gear train 440 is comprised of a plurality of shafts 442 each having a gear 444 that meshes with the gear 425. The gear 444 engages a portion of the shaft 442, a ring gear 448 and a hub gear 462, which is the input side of the overrunning clutch 460. In operation, the gear train 440 converts the high speed, low torque output of the turbine section 420 into low speed, high torque input for the clutch 460.

The clutch 460 is a pawl and ratchet type clutch. The clutch 460 has the hub gear 462 on its input side and a clutch drive shaft 470 on its output side. The hub gear 462 has a hollow cylindrical hub portion 463, which is supported on a bearing 464 and has a ratchet 465 circumferentially positioned along its external surface. Adjacent to the hub gear 462 is a hollow drive shaft assembly comprising a clutch housing 468 integral with a clutch drive shaft 470, and mounted on bearing 471 for rotation. A portion of the drive shaft 470 extends beyond the housing 413 and has an air turbine starter output shaft 490 mounted thereon. The output shaft 490 can be coupled, for example, to a starter pad on the gearbox of a gas turbine engine, (not shown).

The dual actuator starter control valve 100 controls the air flow to the air turbine starter 410 and allows its operation through the energy provided by the compressed air.

The devices described above provide industrial applicability by providing one or more of the following benefits or uses. In particular, an air turbine starter valve is provided that overcomes the obstruction provided by frozen moisture. From this, aircraft turbine engines are more easily started and require less maintenance. Flights are able to take off on time more often. Greater safety is achieved as mid-air restarting of the engine is not disabled by air starter valves that are frozen shut.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A method for retrofitting an air turbine starter for controlling pressurized air flow thereto, the steps comprising:

providing a valve body with an inlet, an outlet, and an interior surface defining a passageway therebetween;

providing a valve mounted in the valve body passageway for movement between an open position and a closed position to control flow through the valve body;

providing a first actuator coupled to the valve to selectively urge the valve toward the open position upon flow of pressurized air to the valve; and providing a second actuator coupled to the valve to selectively urge the valve toward the open position upon flow of pressurized air to the valve.

2. A method for retrofitting an air turbine starter as set forth in claim 1, wherein the valve comprises a butterfly valve.

3. A method for retrofitting an air turbine starter as set forth in claim 1, the steps further comprising:

providing a control valve, the control valve controlling flow of pressurized air to the first and second actuators.

4. A method for retrofitting an air turbine starter as set forth in claim 3, wherein the control valve further comprises:

a solenoid-controlled valve, the solenoid-controlled valve controlling air flow to the first and second actuators.

5. A method for retrofitting an air turbine starter as set forth in claim 1, further comprising:

the first actuator being a piston-type actuator; and the second actuator being a piston-type actuator.

6. A method for retrofitting an air turbine starter as set forth in claim 1, the steps further comprising:

providing first and second lever arms;

the first lever arm coupled to the valve and to the first actuator, the first lever arm communicating urging of the first actuator to the valve; and the second lever arm coupled to the valve and to the second actuator, the second lever arm communicating urging of the second actuator to the valve.

7. A method for retrofitting an air turbine starter as set forth in claim 1, further comprising:

the first actuator oppositely opposed the second actuator across the valve so that the valve receives opposed and coordinated urging from the first and second actuators.

8. A method for retrofitting an air turbine starter as set forth in claim 1, the steps further comprising:

providing an engine starter, the engine starter controlled by the valve.

9. A method for retrofitting a turbine engine with a turbine starter valve for controlling pressurized air flow in starting the turbine engine, the steps comprising:

providing a butterfly valve, the butterfly valve controlling air flow to the air turbine engine by having an open position and a closed position;

providing a first piston-type actuator, the first actuator coupled to the butterfly valve and urging the butterfly valve to the open position upon flow of pressurized air to the butterfly valve;

providing a second piston-type actuator, the second actuator coupled to the butterfly valve and urging the butterfly valve to the open position upon flow of pressurized air to the butterfly valve;

providing first and second lever arms, the first lever arm coupled to the butterfly valve and to the first actuator, the first lever arm communicating urging of the first actuator to the butterfly valve and the second lever arm coupled to the butterfly valve and to the second actuator, the second lever arm communicating urging of the second actuator to the butterfly valve, the first actuator oppositely opposed the second actuator across the butterfly valve so that the butterfly valve receives opposed and coordinated urging from the first and second actuators;

providing a solenoid-controlled valve, the solenoid-controlled valve controlling air flow to the first and second actuators; and providing a housing, the housing enclosing and protecting the first and second actuators; whereby the butterfly valve is less susceptible to being stuck in the closed position by obstruction.

10. A method for retrofitting an air turbine starter as set forth in claim 9, the steps further comprising:

providing an engine starter, the engine starter controlled by the butterfly valve.

11. A method of providing a retrofit air turbine starter valve for controlling pressurized air flow in air turbine starter, the steps comprising:

provding a valve body with an inlet, an outlet, and an interior surface defining a passageway therebetween;

providing a valve mounted in the valve body passageway for movement between an open position and a closed position to control flow through the valve body;

providing a first actuator coupled to the valve to selectively urge the valve toward the open position upon flow of pressurized air to the valve; and providing a second actuator coupled to the valve to selectively urge the valve toward the open position upon flow of pressurized air to the valve.

12. A method of providing a retrofit air turbine starter valve for controlling pressurized air flow in an air turbine starter as set forth in claim 11, wherein the valve comprises a butterfly valve.

13. A method of providing a retrofit air turbine starter valve for controlling pressurized air flow in an air turbine starter as set forth in claim 11, the steps further comprising:

providing a control valve, the control valve controlling flow of pressurized air to the first and second actuators.

14. A method of providing a retrofit air turbine starter valve for controlling pressurized air flow in an air turbine starter as set forth in claim 13, wherein the control valve further comprises:

a solenoid-controlled valve, the solenoid-controlled valve controlling air flow to the first and second actuators.

15. A method of providing a retrofit air turbine starter valve for controlling pressurized air flow in an air turbine starter as set forth in claim 13, further comprising:

the first actuator being a piston-type actuator; and
the second actuator being a piston-type actuator.

16. A method of providing a retrofit air turbine starter valve for controlling pressurized air flow in an air turbine starter as set forth in claim 13, the steps further comprising:

providing first and second lever arms;

the first lever arm coupled to the valve and to the first actuator, the first lever arm communicating urging of the first actuator to the valve; and the second lever arm coupled to the valve and to the second actuator, the second lever arm communicating urging of the second actuator to the valve.

17. A method of providing a retrofit air turbine starter valve for controlling pressurized air flow in an air turbine starter as set forth in claim 13, further comprising:

the first actuator oppositely opposed the second actuator across the valve so that the valve receives opposed and coordinated urging from the first and second actuators.

18. A method of providing a retrofit air turbine starter valve for controlling pressurized air flow in an air turbine starter as set forth in claim 13, the steps further comprising:

providing an engine starter, the engine starter controlled by the valve.

19. A method of providing a retrofit air turbine starter valve for controlling pressurized air flow in an air turbine starter, the steps comprising:

providing a butterfly valve, the butterfly valve controlling air flow to the air turbine engine by having an open position and a closed position;

providing a first piston-type actuator, the first actuator coupled to the butterfly valve and urging the butterfly valve to the open position upon flow of pressurized air to the butterfly valve;

providing a second piston-type actuator, the second actuator coupled to the butterfly valve and urging the butterfly valve to the open position upon flow of pressurized air to the butterfly valve;

providing first and second lever arms, the first lever arm coupled to the butterfly valve and to the first actuator, the first lever arm communicating urging of the first actuator to the butterfly valve and the second lever arm coupled to the butterfly valve and to the second actuator, the second lever arm communicating urging of the second actuator to the butterfly valve, the first actuator oppositely opposed the second actuator across the butterfly valve so that the butterfly valve receives opposed and coordinated urging from the first and second actuators;

providing a solenoid-controlled valve, the solenoid-controlled valve controlling air flow to the first and second actuators; and providing a housing, the housing enclosing and protecting the first and second actuators; whereby the butterfly valve is less susceptible to being stuck in the closed position by obstruction.

20. A method of providing a retrofit air turbine starter valve for controlling pressurized air flow in an air turbine starter as set forth in claim 19, the steps further comprising:

providing an engine starter, the engine starter controlled by the butterfly valve.

21. An air turbine starter for starting an air turbine engine, the air turbine starter having an air flow valve, comprising:

a valve body with an inlet, an outlet, and an interior surface defining a passageway therebetween;

a valve mounted in the valve body passageway for movement between an open position and a closed position to control flow through the valve body;

a first actuator coupled to the valve to selectively urge the valve toward the open position upon flow of pressurized air to the valve; and a second actuator coupled to the valve to selectively urge the valve toward the open position upon flow of pressurized air to the valve.

22. An air turbine starter for starting an air turbine engine as set forth in claim 21 wherein the valve comprises a butterfly valve.

23. An air turbine starter for starting an air turbine engine as set forth in claim 21, further comprising:

a control valve, the control valve controlling flow of pressurized air to the first and second actuators.

24. An air turbine starter for starting an air turbine engine as set forth in claim 23, wherein the control valve further comprises:

a solenoid-controlled valve, the solenoid-controlled valve controlling air flow to the first and second actuators.

25. An air turbine starter for starting an air turbine engine as set forth in claim 21, further comprising:

the first actuator being a piston-type actuator; and
the second actuator being a piston-type actuator.

26. An air turbine starter for starting an air turbine engine as set forth in claim 21, further comprising:

first and second lever arms;

the first lever arm coupled to the valve and to the first actuator, the first lever arm communicating urging of the first actuator to the valve; and the second lever arm coupled to the valve and to the second actuator, the second lever arm communicating urging of the second actuator to the valve.

27. An air turbine starter for starting an air turbine engine as set forth in claim 21, further comprising:

the first actuator oppositely opposed the second actuator across the valve so that the valve receives opposed and coordinated urging from the first and second actuators.

28. An air turbine starter for starting an air turbine engine as set forth in claim 21, further comprising:
   an engine starter, the engine starter controlled by the valve.

29. An air turbine starter for starting an air turbine engine, the air turbine starter having an air flow valve, comprising:
   a butterfly valve, the butterfly valve controlling air flow to the air turbine engine by having an open position and a closed position;
   a first piston-type actuator, the first actuator coupled to the butterfly valve and urging the butterfly valve to the open position upon flow of pressurized air to the butterfly valve;
   a second piston-type actuator, the second actuator coupled to the butterfly valve and urging the butterfly valve to the open position upon flow of pressurized air to the butterfly valve;
   first and second lever arms;
   the first lever arm coupled to the butterfly valve and to the first actuator, the first lever arm communicating urging of the first actuator to the butterfly valve;
   the second lever arm coupled to the butterfly valve and to the second actuator, the second lever arm communicating urging of the second actuator to the butterfly valve;
   the first actuator oppositely opposed the second actuator across the butterfly valve so that the butterfly valve receives opposed and coordinated urging from the first and second actuators
   a solenoid-controlled valve, the solenoid-controlled valve controlling air flow to the first and second actuators; and
   a housing, the housing enclosing and protecting the first and second actuators; whereby
   the butterfly valve is less susceptible to being stuck in the closed position by obstruction.

30. An air turbine starter for starting an air turbine engine as set forth in claim 29, further comprising:
   an engine starter, the engine starter controlled by the butterfly valve.

31. An air turbine starter valve for controlling pressurized air flow in starting an air turbine engine, the air turbine starter valve comprising:
   a valve body with a first opening, a second opening, and an interior surface defining a passageway therebetween;
   a valve mounted in the valve body passageway for movement between an open position and a closed position to control flow through the valve body;
   a first actuator, coupled to the valve to selectively urge the valve toward the open position upon flow of pressurized air to the valve; and
   a second actuator, coupled to the valve to selectively urge the valve toward the open position upon flow of pressurized air to the valve.

32. An air turbine starter valve for controlling pressurized air flow in starting an air turbine engine as set forth in claim 31 wherein the valve comprises a butterfly valve.

33. An air turbine starter valve for controlling pressurized air flow in starting an air turbine engine as set forth in claim 31, further comprising:
   a control valve, the control valve controlling flow of pressurized air to the first and second actuators.

34. An air turbine starter valve for controlling pressurized air flow in starting an air turbine engine as set forth in claim 33, wherein the control valve further comprises:
   a solenoid-controlled valve, the solenoid-controlled valve controlling air flow to the first and second actuators.

35. An air turbine starter valve for controlling pressurized air flow in starting an air turbine engine as set forth in claim 31, further comprising:
   the first actuator being a piston-type actuator; and
   the second actuator being a piston-type actuator.

36. An air turbine starter valve for controlling pressurized air flow in starting an air turbine engine as set forth in claim 31, further comprising:
   first and second lever arms;
   the first lever arm coupled to the valve and to the first actuator, the first lever arm communicating urging of the first actuator to the valve; and
   the second lever arm coupled to the valve and to the second actuator, the second lever arm communicating urging of the second actuator to the valve.

37. An air turbine starter valve for controlling pressurized air flow in starting an air turbine engine as set forth in claim 31, further comprising:
   the first actuator oppositely opposed the second actuator across the valve so that the valve receives opposed and coordinated urging from the first and second actuators.

38. An air turbine starter valve for controlling pressurized air flow in starting an air turbine engine as set forth in claim 31, further comprising:
   an engine starter, the engine starter controlled by the valve.

39. An air turbine starter valve for controlling pressurized air flow in starting an air turbine engine, comprising:
   a butterfly valve, the butterfly valve controlling air flow to the air turbine engine by having an open position and a closed position;
   a first piston-type actuator, the first actuator coupled to the butterfly valve and urging the butterfly valve to the open position upon flow of pressurized air to the butterfly valve;
   a second piston-type actuator, the second actuator coupled to the butterfly valve and urging the butterfly valve to the open position upon flow of pressurized air to the butterfly valve;
   first and second lever arms;
   the first lever arm coupled to the butterfly valve and to the first actuator, the first lever arm communicating urging of the first actuator to the butterfly valve;
   the second lever arm coupled to the butterfly valve and to the second actuator, the second lever arm communicating urging of the second actuator to the butterfly valve;
   the first actuator oppositely opposed the second actuator across the butterfly valve so that the butterfly valve receives opposed and coordinated urging from the first and second actuators
   a solenoid-controlled valve, the solenoid-controlled valve controlling air flow to the first and second actuators; and
   a housing, the housing enclosing and protecting the first and second actuators; whereby
   the butterfly valve is less susceptible to being stuck in the closed position by obstruction.

40. An air turbine starter valve for controlling pressurized air flow in starting an air turbine engine as set forth in claim 39, further comprising:
   an engine starter, the engine starter controlled by the butterfly valve.

* * * * *